US008699750B2

(12) United States Patent
Jo

(10) Patent No.: US 8,699,750 B2
(45) Date of Patent: Apr. 15, 2014

(54) IMAGE PROCESSING APPARATUS

(75) Inventor: Young-gwan Jo, Changwon (KR)

(73) Assignee: Samsung Techwin Co., Ltd., Changwon (KR)

(*) Notice: Subject to any disclaimer, the term of this patent is extended or adjusted under 35 U.S.C. 154(b) by 242 days.

(21) Appl. No.: 13/204,161

(22) Filed: Aug. 5, 2011

(65) Prior Publication Data

US 2012/0033854 A1 Feb. 9, 2012

(30) Foreign Application Priority Data

Aug. 6, 2010 (KR) ........................ 10-2010-0075979

(51) Int. Cl.
*G06K 9/00* (2006.01)
*G06K 9/36* (2006.01)

(52) U.S. Cl.
USPC ........... 382/103; 382/106; 382/107; 382/286; 382/291

(58) Field of Classification Search
USPC ........................................................ 382/107
See application file for complete search history.

(56) References Cited

U.S. PATENT DOCUMENTS

| | | | | |
|---|---|---|---|---|
| 7,991,193 | B2 * | 8/2011 | Hampapur et al. | 382/103 |
| 8,131,079 | B2 * | 3/2012 | Hayasaka et al. | 382/181 |
| 8,224,027 | B2 * | 7/2012 | Kim | 382/103 |
| 8,331,729 | B2 * | 12/2012 | Park et al. | 382/286 |
| 2002/0055955 | A1 * | 5/2002 | Lloyd-Jones et al. | 707/512 |
| 2009/0128549 | A1 * | 5/2009 | Gloudemans et al. | 345/419 |
| 2009/0180583 | A1 * | 7/2009 | Park et al. | 377/9 |
| 2009/0219381 | A1 * | 9/2009 | Ayala | 348/43 |
| 2009/0315978 | A1 * | 12/2009 | Wurmlin et al. | 348/43 |
| 2010/0046804 | A1 * | 2/2010 | Gu et al. | 382/107 |
| 2011/0051808 | A1 * | 3/2011 | Quast et al. | 375/240.08 |
| 2012/0027299 | A1 * | 2/2012 | Ran | 382/173 |

FOREIGN PATENT DOCUMENTS

| | | | |
|---|---|---|---|
| JP | 2008-77430 | A | 4/2008 |
| JP | 2009-223693 | A | 10/2009 |
| KR | 10-0450579 | B1 | 9/2004 |
| KR | 10-2007-0113366 | A | 11/2007 |
| KR | 10-2009-0078982 | A | 7/2009 |

* cited by examiner

*Primary Examiner* — Vu Le
*Assistant Examiner* — Soo Park
(74) *Attorney, Agent, or Firm* — Sughrue Mion, PLLC

(57) ABSTRACT

Provided are an image processing apparatus and method for counting moving objects in an image, the apparatus including: a motion detection unit which detects motion in an image; an object detection unit which detects objects based on the motion detected by the motion detection unit; an outline generation unit which generates at least one reference outline of which a size is adjusted according to a preset parameter based on a location in the image; and a calculation unit which calculates a number of objects having substantially a same size as that of the at least one reference outline from among the objects detected by the object detection unit, wherein the preset parameter is adjusted according to at least one circumstantial parameter.

13 Claims, 5 Drawing Sheets

IMAGE PROCESSING APPARATUS

CROSS-REFERENCE TO RELATED PATENT APPLICATION

This application claims priority from Korean Patent Application No. 10-2010-0075979 filed on Aug. 6, 2010, in the Korean Intellectual Property Office, the disclosure of which is incorporated herein by reference in its entirety.

BACKGROUND

1. Field

Apparatuses consistent with exemplary embodiments relate to an image processing apparatus, and more particularly, an image processing apparatus and method for counting moving objects in a captured image.

2. Description of the Related Art

Currently, security cameras are increasingly installed inside or outside buildings and in streets on various purposes such as crime prevention and security. A plurality of security cameras may be connected to a main server via a network by wire or wirelessly, and the main server may simultaneously control the connected security cameras.

An image processing apparatus such as a security camera or a main server may capture and store an image. Also, if an unknown event occurs, the captured image may be analyzed to learn more about the unknown event. However, it is sometimes difficult to analyze images, and more particularly, it is sometimes difficult to analyze moving objects in captured images.

SUMMARY

The present invention provides an image processing apparatus capable of allowing a user to easily use an algorithm for counting moving objects in a captured image.

According to an aspect of an exemplary embodiment, there is provided an image processing apparatus which may include: a motion detection unit which detects motion in an image; an object detection unit which detects objects based on the motion detected by the motion detection unit; an outline generation unit which generates at least one reference outline of which a size is adjusted according to a preset parameter based on a location in the image; and a calculation unit which calculates a number of objects having substantially a same size as that of the at least one reference outline from among the objects detected by the object detection unit, wherein the preset parameter is adjusted according to at least one circumstantial parameter.

The at least one circumstantial parameter may be changed according to at least one of a height, an image capturing angle, a zoom ratio, a lens distortion characteristic, and a principal point of a device for capturing the image.

The at least one circumstantial parameter may be quantized to a preset number of quantized parameters.

The image processing apparatus may further include: a user interface (UI) generation unit which generates a size-adjusting UI for allowing a user to select one of the quantized parameters; and a display unit which displays the image and the size-adjusting UI.

The UI generation unit may change the size-adjusting UI according to a dimension of the at least one circumstantial parameter.

A preset number of the at least one reference outline may be displayed on the image according to the at least one circumstantial parameter, wherein the at least one circumstantial parameter is selected by the user.

The at least one circumstantial parameter may be selected by a user from among a plurality of circumstantial parameters.

According to an aspect of another exemplary embodiment provides image processing apparatus, which may include: a user interface (UI) generation unit which generates a size-adjusting UI, wherein the generated UI is operable to select at least one circumstantial parameter for determining a size of at least one reference outline used to detect objects in a captured image; and a display unit which displays the captured image and the size-adjusting UI.

The size-adjusting UI may be operable to allow a user to select values corresponding to a dimension of the at least one circumstantial parameter.

The display unit may display a preset number of the at least one reference outline.

The at least one circumstantial parameter may be quantized such that the size of the at least one reference outline is linearly changed.

The size of the at least one reference outline may be changeable based on a location in the captured image.

According to an aspect of another exemplary embodiment provides a method of counting the number of moving objects in an image captured by a motion-detecting image processing apparatus, wherein the method may include: detecting motion in the captured image; detecting objects in the captured image based on the motion detected in the captured image; generating at least one reference outline of which a size is adjusted according to a preset parameter based on a location in the captured image; and calculating a number of objects having substantially a same size as that of the at least one reference outline from among the objects detected in the captured image, wherein the preset parameter is adjusted according to at least one circumstantial parameter.

The method may further include: generating a size-adjusting user interface which is operable to allow a user to select one of the quantized parameters; and displaying the captured image and the size-adjusting UI.

BRIEF DESCRIPTION OF THE DRAWINGS

The above and other features will become more apparent by describing in detail exemplary embodiments with reference to the attached drawings in which.

DETAILED DESCRIPTION

Figure 1:
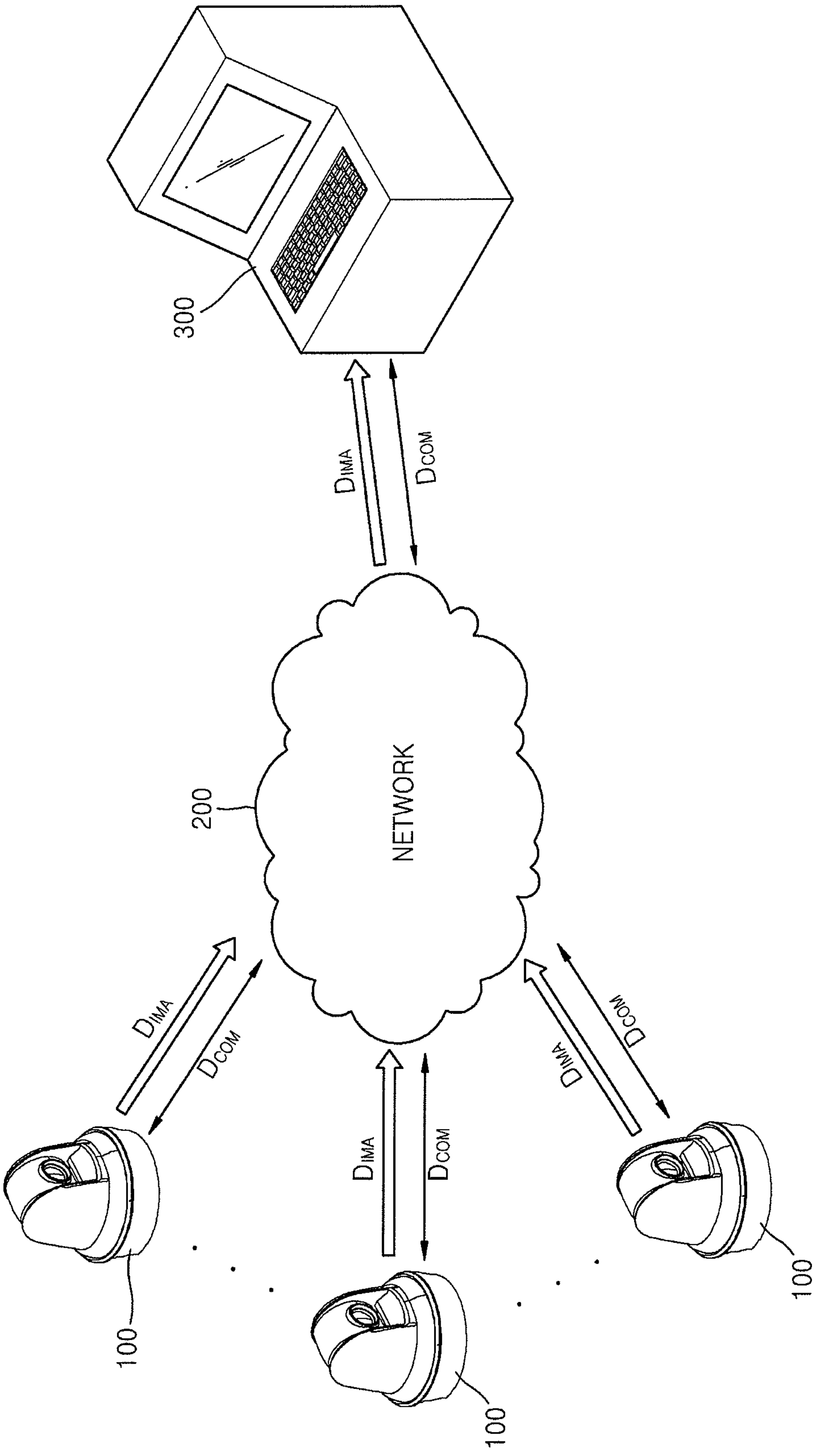
FIG. 1 is a schematic diagram of a system using an image processing apparatus, according to an exemplary embodiment.

Hereinafter, the present invention will be described in detail by explaining exemplary embodiments of the invention with reference to the attached drawings. Like reference numerals in the drawings denote like elements and thus repeated descriptions will be omitted.

In the following description, only essential parts for understanding operation will be described and other parts may be omitted in order not to make the subject matter unclear. Also, the terms used in the specification and the claims should not be limited to conventional or lexical meanings and should be construed as having meanings and concepts corresponding to the general technical idea set forth herein.

FIG. 1 is a schematic diagram of a system in which a plurality of security cameras 100 communicate with a main server 300 via a network 200, according to an exemplary embodiment.

Referring to FIG. 1, the security cameras 100 exchange data with the main server 300 via the network 200. In more detail, the security cameras 100 communicate with the main server 300 via communication channels $D_{COM}$, and transmit live-view video data to the main server 300 via image data channels $D_{IMA}$. Here, various modifications are allowed. For example, only one security camera, instead of a plurality of security cameras, may communicate with a main server, or one or a plurality of security cameras may communicate with a plurality of main servers. Here, the network 200 for forming the communication channels $D_{COM}$ and the image data channels $D_{IMA}$ may be any that is capable of transmitting and receiving data or commands by wire or wirelessly. For example, the network 200 may connect the security cameras 100 to the main server 300 by using cables, or by using a wireless local area network (WLAN).

Although the main server 300 is similar to a computer in FIG. 1, the current exemplary embodiment is not limited thereto and the security cameras 100 may communicate with any other apparatus having a display screen. For example, the main server 300 may be a personal computer. If necessary, the main server 300 may store the live-view video data received from the security cameras 100.

Figure 2:
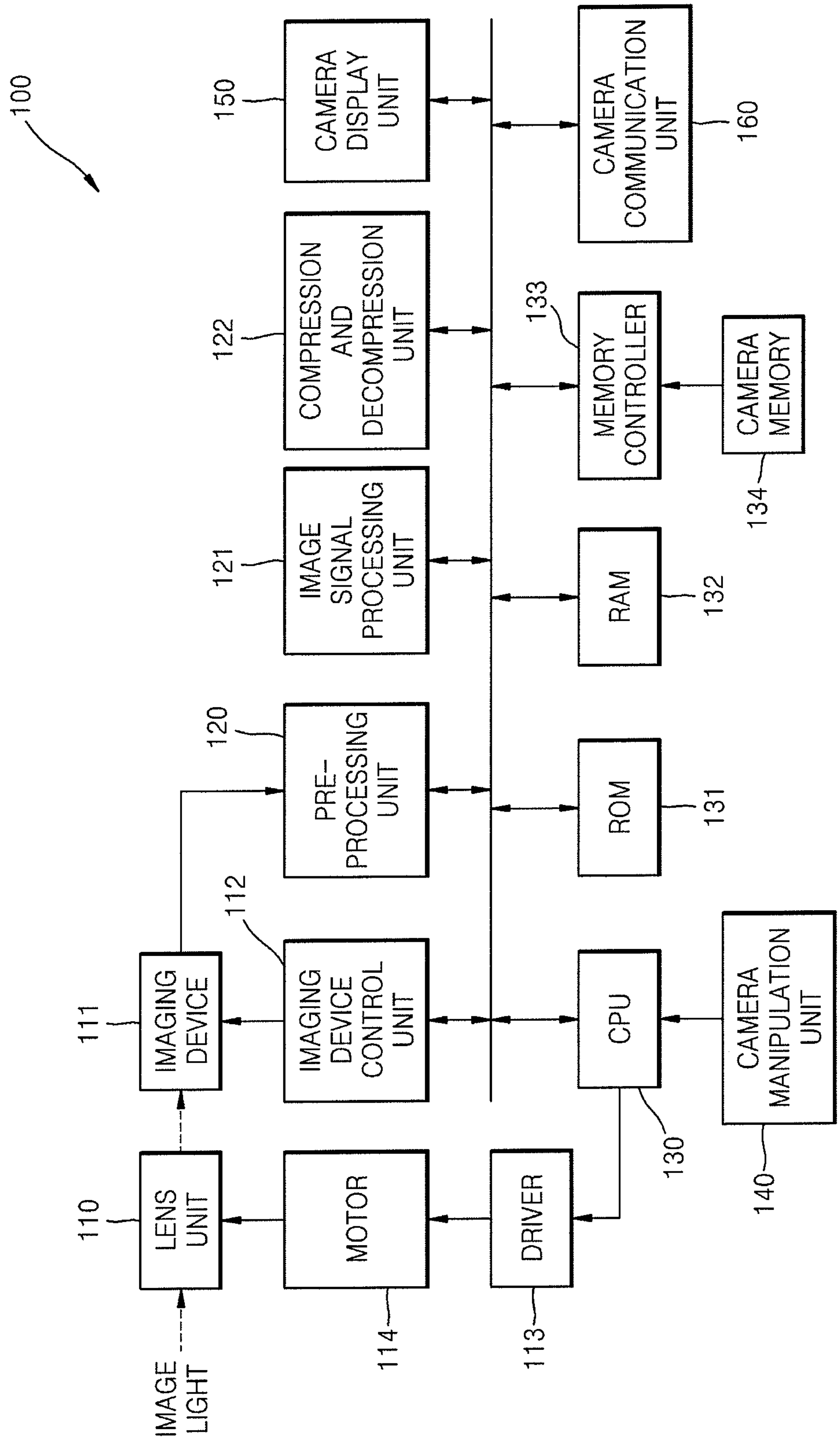
FIG. 2 is a block diagram of a security camera using an image processing apparatus, according to an exemplary embodiment.

FIG. 2 is a block diagram of the security camera 100 using an image processing apparatus, according to an exemplary embodiment.

Referring to FIG. 2, the security camera 100 may include a lens unit 110, an imaging device 111, an imaging device control unit 112, a driver 113, a motor 114, a pre-processing unit 120, an image signal processing unit 121, a compression and decompression unit 122, a central processing unit (CPU) 130, a read only memory (ROM) 131, a random access memory (RAM) 132, a memory controller 133, a camera memory 134, a camera manipulation unit 140, a camera display unit 150, and a camera communication unit 160. The term "unit" as used herein means a hardware component and/or a software component that is executed by a hardware component such as a processor.

The lens unit 110 is an optical system for focusing external light on the imaging device 111, and transmits light incident from a subject, to the imaging device 111. The lens unit 110 includes a group of lenses such as a zoom lens for changing a focal length and a focus lens for adjusting a focus, and an iris for adjusting the intensity of transmission light.

The zoom lens, the iris, and the focus lens included in the lens unit 110 are driven by the motor 114 that receives a driving signal from the driver 113.

The imaging device 111 is an example of a photoelectric converter, and includes a plurality of elements for imaging light incident and transmitted through the lens unit 110 and converting the light into an electrical signal. The imaging device 111 generates an image signal by using electrical signals generated by the elements. In this case, the imaging device 111 generates the image signal by periodically capturing frame images in a preset cycle according to a timing signal received from the imaging device control unit 112. The imaging device 111 may be, for example, a charge coupled device (CCD) sensor or a complementary metal oxide semiconductor (CMOS) sensor. The imaging device 111 generates a digital signal by analog-to-digital (A/D) converting the image signal and outputs the digital signal to the pre-processing unit 120.

The imaging device control unit 112 generates the timing signal and controls the imaging device 111 to capture an image in synchronization with the timing signal.

The pre-processing unit 120 pre-processes the digital signal output from the imaging device 111 and generates an image signal that is image-processable. The pre-processing unit 120 outputs the image signal to the image signal processing unit 121. Also, the pre-processing unit 120 controls image data to be read from and written into the RAM 132.

The image signal processing unit 121 receives the image signal from the pre-processing unit 120, and generates an image-processed image signal according to a white balance (WB) control value, a gamma (γ) value, and an outline enhancement control value. The image-processed image signal may be provided to the compression and decompression unit 122. Alternatively, the image-processed image signal may be used as a live-view image and may be transmitted to the camera display unit 150 via the RAM 132.

Meanwhile, in the current exemplary embodiment, the image signal processing unit 121 determines whether a moving object exists in the frame images periodically captured by the imaging device 111 and, if a moving object is detected, counts the number of detected objects. The function of the image signal processing unit 121 will be described in detail below with reference to FIGS. 4 through 8.

The compression and decompression unit 122 receives the image signal that is not yet compressed, and compresses the image signal in a compression format of, for example, MPEG, ACI, MOV, or ASD. The compression and decompression unit 122 generates an image file including image data of the compressed image signal and transmits the image file to the memory controller 133. Alternatively, the compression and decompression unit 122 may input the image file to the camera communication unit 160 and may transmit the image file via the camera communication unit 160 to the main server 300 for controlling the security camera 100. Also, if the camera display unit 150 is included, the compression and decompression unit 122 may extract an image file stored in the camera memory 134 and may decompress the image file to be reproduced on the camera display unit 150.

The CPU 130 functions as a calculation device and a control device by using programs, and controls processing of other elements included in the security camera 100. For example, the CPU 130 drives the motor 114 by outputting a signal to the driver 113 according to focus control or exposure control. Also, the CPU 130 controls other elements of the security camera 100 according to signals received from the camera manipulation unit 140. Furthermore, although one CPU 130 is illustrated in FIG. 2, a plurality of CPUs may be included so as to execute commands of a signal system and an operation system in separated CPUs.

The ROM 131 may store user-set data related to, for example, an image capturing condition. Also, the ROM 131 may store algorithms used by the CPU 130 to control the security camera 100. The ROM 131 may be, for example, electrically erasable and programmable read only memory (EEPROM).

The RAM 132 temporarily stores various data such as the image signal output from the pre-processing unit 120 and data generated when the image signal processing unit 121 processes the image signal. The RAM 132 may be, for example, dynamic RAM (DRAM).

The memory controller 133 controls an operation of writing image data into the camera memory 134, or an operation of reading image data or setup information recorded on the camera memory 134. The camera memory 134 may be, for example, an optical disk (a CD, a DVD, a Blu-ray disk, etc.), an optical magnetic disk, a magnetic disk, or a semiconductor storage medium, and records captured image data. The image data may be data included in the image file generated by the compression and decompression unit 122. The memory controller 133 and the camera memory 134 may be detachable from the security camera 100. However, the memory controller 133 and the camera memory 134 does not always need to be included in the security camera 100 and, if the security camera 100 is connected to the main server 300 via the network 200, the main server 300 for controlling the security camera 100 may include a server memory 340 (see FIG. 3) for storing the image data or the like. In this case, the image data or the like may be transmitted by the camera communication unit 160 from the security camera 100 to the main server 300 via the network 200.

The camera manipulation unit 140 includes, for example, various buttons or levers mounted on the security camera 100, and transmits a manipulation signal to the CPU 130 according to a manipulation of a user. However, the camera manipulation unit 140 does not always need to be included in the security camera 100 and, if the security camera 100 is connected to the main server 300 via the network 200, the main server 300 for controlling the security camera 100 may include a server manipulation unit 320 (see FIG. 3) for providing signals to control the operation of the security camera 100.

The camera display unit 150 displays a captured image, an image captured and stored in the camera memory 134, or an image decompressed by the compression and decompression unit 122. Also the camera display unit 150 may display various setup screens for controlling the security camera 100. For example, the camera display unit 150 may display a size-adjusting user interface (UI) for changing a circumstantial parameter. However, the camera display unit 150 does not always need to be included in the security camera 100 and, if the security camera 100 is connected to the main server 300 via the network 200, the main server 300 for controlling the security camera 100 may include a server display unit 350 (see FIG. 3) for displaying the captured image, the various setup screens, or the like. The circumstantial parameter will be described in detail below with reference to FIG. 4.

The camera communication unit 160 transmits a live-view image captured by the security camera 100 or an image captured and stored in the camera memory 134 via the network 200 by wire or wirelessly to an external apparatus, e.g., the main server 300. Also, the camera communication unit 160 receives various command signals transmitted from the main server 300 via the network 200.

Figure 3:
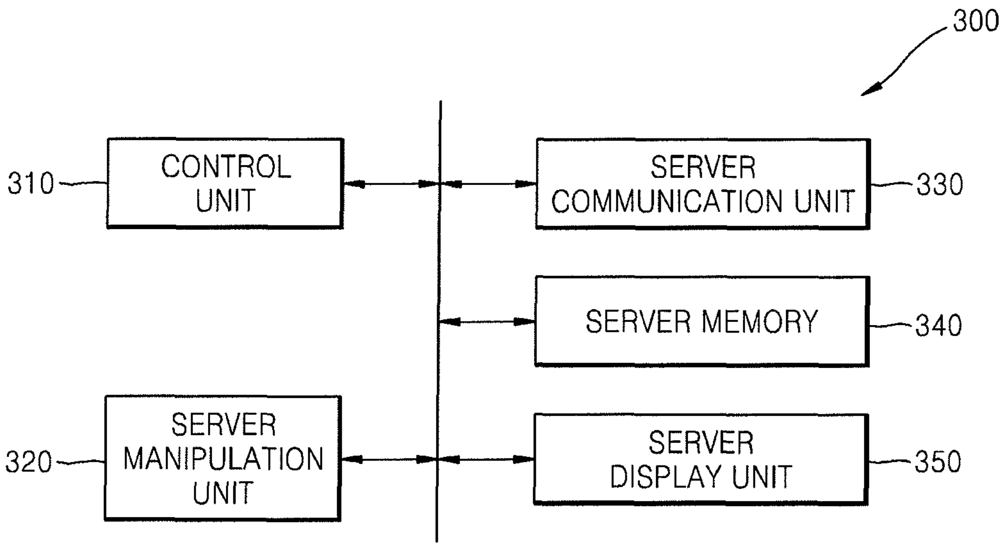
FIG. 3 is a block diagram of a main server using an image processing apparatus, according to an exemplary embodiment.

FIG. 3 is a block diagram of the main server 300 using an image processing apparatus, according to an exemplary embodiment.

Referring to FIG. 3, the main server 300 may include a control unit 310, the server manipulation unit 320, a server communication unit 330, the server memory 340, and the server display unit 350.

The control unit 310 controls operations of other elements included in the main server 300. Also, the control unit 310 receives a manipulation signal from the server manipulation unit 320, and generates a command signal for controlling the main server 300 or the security camera 100 according to the received manipulation signal. The control unit 310 transmits a command signal for controlling the main server 300 to a corresponding element included in the main server 300, and transmits a command signal for controlling the security camera 100 to the server communication unit 330.

The control unit 310 may receive an image from the server communication unit 330 and may perform various types of image signal processing on the received image. Also, the control unit 310 may convert a file format of an image transmitted from the security camera 100 into a file format reproducible by the server display unit 350.

Meanwhile, the control unit 310 determines whether a moving object exists in the received image and, if a moving object is detected, counts the number of detected objects. The control unit 310 may be realized as a general-use CPU. The function of the control unit 310 will be described in detail below with reference to FIGS. 4 through 8.

The server manipulation unit 320 may include, for example, various buttons or levers for controlling the operation of the main server 300 or the security camera 100. The server manipulation unit 320 transmits a manipulation signal to the control unit 310 according to a manipulation of a user.

The server communication unit 330 receives a live-view image captured by the security camera 100 or an image captured and stored in the camera memory 134 via the network 200 by wire or wirelessly. Also, the server communication unit 330 may receive from the control unit 310 a command signal for controlling the security camera 100 and may transmit the command signal to the security camera 100. Here, the command signal may be generated according to the manipulation signal received by the control unit 310 from the server manipulation unit 320.

The server memory 340 may store algorithms or various setup data for controlling the main server 300, and temporarily stores various data. Also, the server memory 340 may receive and store an image captured by the security camera 100. The server memory 340 may be, for example, an optical disk (a CD, a DVD, a Blu-ray disk, etc.), an optical magnetic disk, a magnetic disk, or a semiconductor storage medium.

The server display unit 350 may receive and display the live-view image captured by the security camera 100 or the image stored in the camera memory 134. Also, the server display unit 350 may display various setup screens for controlling the security camera 100. For example, the server display unit 350 may display a size-adjusting UI for changing a circumstantial parameter.

A method of counting the number of objects in a captured image will now be described with reference to FIGS. 4 through 8.

Figure 4:
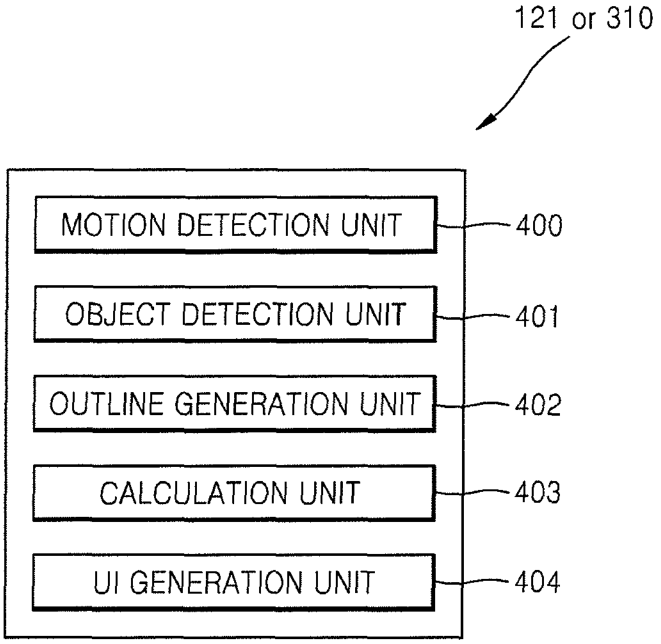
FIG. 4 is a block diagram of an image signal processing unit or a control unit according to an exemplary embodiment.

FIG. 4 is a block diagram of the image signal processing unit 121 or the control unit 310 according to an exemplary embodiment.

Referring to FIG. 4, at least one of the image signal processing unit 121 and the control unit 310 includes a motion detection unit 400, an object detection unit 401, an outline generation unit 402, a calculation unit 403, and a UI generation unit 404. Hereinafter, the image signal processing unit 121 and the control unit 310 are integrally referred as 'a signal processing unit'.

The motion detection unit 400 detects whether a motion exists in an input image. For example, in order to detect a motion, the motion detection unit 400 may generate a color model by using a Gaussian mixture model on each pixel of the image, and may compare the generated color module to pixel data. However, the motion detection algorithm is not limited thereto and various other algorithms may also be used.

If a motion is detected in the image, the object detection unit 401 detects an object by using information regarding pixels from which the motion is detected. For example, if one object moves, a motion is detected from pixels on a boundary of the object. Accordingly, the object detection unit 401 may detect an object by determining a set of pixels for forming one closed loop, e.g., a boundary, as one object. However, the object detection algorithm is not limited thereto and various other algorithms may also be used.

The outline generation unit 402 receives information regarding the pixels for forming the object detected by the object detection unit 401, and generates an outline that surrounds pixels regarded as one object according to the received information. However, the outline of the object may not refer to an actual silhouette of the object, and may be other shapes, such as a rectangular outline generated by using uppermost, lowermost, leftmost, and rightmost pixels of the detected object.

Also, the outline generation unit 402 generates at least one reference outline of which a size is adjusted according to a preset parameter based on a location in the image. The reference outline is used to determine whether the object detected by the object detection unit 401 satisfies a certain condition. For example, if the size of the outline of the detected object is the same as the size of the reference outline, the detected object may be determined as a person. However, in addition to a case when the size of the outline of the detected object is exactly the same as the size of the reference outline, if the size of the outline of the detected object is substantially the same as the size of the reference outline, or if the size of the outline of the detected object is included in a predetermined error range of the size of the reference outline, the detected object may also be determined as a person. The reference outline may have a changeable size according to a location in the image.

The calculation unit 403 calculates the number of objects of which outlines have sizes are the same as the size of the reference outline from among the objects detected by the object detection unit 401.

A method of generating the reference outline will now be described.

As stated above, the reference outline provides a reference size used to determine whether the object detected by the object detection unit 401 satisfies a certain condition. The reference outline has a changeable size according to a location in the image. With respect to a coordinate (x,y) in the image, a width w and a height h of the reference outline are as represented in Equation 1.

$$w=f(x,y|a1,a2,\ldots,aN),h=g(x,y|b1,b2,\ldots,bN) \qquad \text{<Equation 1>}$$

In this case, if a width and a height of an object located at (x,y) in the image satisfies Equation 1, it is determined that the object satisfies a certain condition.

Here, A={a1, a2, . . . , aN} and B={b1, b2, . . . , bN} are parameters of functions f(x,y) and g(x,y) for determining the width w and the height h of the reference outline according to a location in the image.

The outline generation unit 402 represents each of the parameters A and B as a function of a circumstantial parameter C that is changed according to circumstances of the security camera 100. That is, each of the parameters A and B is re-parameterized into C={c1, c2, . . . , cM} including M independent parameters as represented in Equation 2.

<Equation 2>

$$\begin{array}{ll} a1=a1(c1,c2,\ldots,cM) & b1=b1(c1,c2,\ldots,cM) \\ a2=a2(c1,c2,\ldots,cM) & b2=b2(c1,c2,\ldots,cM) \\ \ldots & \ldots \\ aN=aN(c1,c2,\ldots,cM) & bN=bN(c1,c2,\ldots,cM) \end{array}$$

That is, the parameters A and B may be changed by changing the Mth circumstantial parameter C.

The circumstantial parameter C is reflected to Equation 1 as represented in Equation 3.

$$w=f(x,y|a1(c1,c2,\ldots cM),a2(c1,c2,\ldots cM),\ldots,aN(c1,c2,\ldots cM)$$

$$h=g(x,y|b1(c1,c2,\ldots cM),b2(c1,c2,\ldots cM),\ldots,bN(c1,c2,\ldots cM)) \qquad \text{<Equation 3>}$$

Here, a dimension of the circumstantial parameter C may be adjusted according to an element that influences the size of the reference outline. For example, if the size of the reference outline is dependent upon only a height of the security camera 100, the circumstantial parameter C may have a one-dimensional value (M=1). Accordingly, the parameters A and B may respectively be A={a1(c1),a2(c1), . . . , aN(c1)} and B={b1(c1),b2(c1), . . . , bN(c1)}.

Meanwhile, for the convenience of a user, the signal processing unit quantizes an allowable range of c1 of the circumstantial parameter C. For example, c1 may be quantized, i.e., set, to have a value from 1 to 10. In the current exemplary embodiment, c1 is a parameter that dependent upon only a height. Accordingly, a range of the height where the security camera 100 is installed is set, and the circumstantial parameter C is quantized to be changed by a predetermined value within the set range. The quantization may be performed in such a way that the size of the reference outline is linearly changed according to a change in the circumstantial parameter C. That is, the quantization may be performed in such a way that an increase rate of the size of the reference outline when a user changes the value of c1 from 1 to 2 is the same as the increase rate of the size of the reference outline when the user changes the value of c1 from 2 to 3, or from 3 to 4. If the circumstantial parameter C is quantized, values of the parameters A and B may be previously calculated and stored according to the quantized value of the circumstantial parameter C. If c1 is quantized to have an integer from 1 to Q, the parameters A and B are represented as follows.

A1={a11, a21, . . . , aN1}, A2={a12, a22, . . . , aN2}, . . . , AQ{a1Q, a2Q, . . . , aNQ}

B1={b11, b21, . . . , bN1}, B2={b12, b22, . . . , bN2}, . . . , BQ{b1Q, b2Q, . . . , bNQ}

(Aq is a set of the parameters A when c=q and Bq is a set of the parameters B when b=q)

Here, a11=a1(1), a21=a2(1), . . . , aN1=aN(1)

a12=a1(2), a22=a2(2), . . . , aN2=aN(2)

a1Q=a1(Q), a2Q=a2(Q), . . . , aNQ=aN(Q)

and b11=b1(1), b21=b2(1), . . . , bN1=bN (1)

b12=b1(2), b22=b2(2), . . . , bN2=bN (2)

b1Q=b1(Q), b2Q=b2(Q), . . . , bNQ=bN (Q).

If a user selects a certain value of the circumstantial parameter C by using a size-adjusting UI generated and displayed by the UI generation unit 404 to be described below, the width w and the height h of the reference outline are calculated by using values of the parameters A and B corresponding to the selected value of the circumstantial parameter C.

Meanwhile, the circumstantial parameter C is not limited to a one-dimensional value (M=1). For example, if the size of the reference outline is dependent upon the height and an image capturing angle of the security camera 100, the circumstantial parameter C has a two-dimensional value (M=2). In this case, the parameters A and B may respectively be A={a1(c1,c2),a2(c1,c2), . . . , aN(c1,c2)} and B={b1(c1,c2),b2(c1,c2), . . . , bN(c1,c2)}. Even when the circumstantial parameter C has a two-dimensional value (M=2), the circumstantial parameter C may be quantized such that the size of the reference outline is linearly changed according to a change in the circumstantial parameter C.

Also, the circumstantial parameter C is not limited to external conditions of the security camera 100, e.g., the height and the image capturing angle. For example, the circumstantial parameter C may relate to internal parameters of the security camera 100, e.g., a zoom ratio, a lens distortion characteristic, and a principal point, e.g., of the lens.

The UI generation unit 404 generates the size-adjusting UI for allowing a user to adjust the size of the reference outline by selecting a quantized value of the circumstantial parameter C. The size-adjusting UI may be formed as a list box, a slide bar having gradations, or a text box in which the user directly inputs a value, so as to allow the user to select at least one quantized value of the circumstantial parameter C. Also, the size-adjusting UI may be changed according to the dimension of the circumstantial parameter C. For example, if the circumstantial parameter C has a three-dimensional value, the size-adjusting UI may be generated to select three values of the circumstantial parameter C.

The generated size-adjusting UI and the reference outline are displayed together with a captured image on the camera display unit 150 or the server display unit 350. In this case, the reference outline is formed as an on screen display (OSD) and is displayed on the image, such that the user may adjust the size of the reference outline in comparison to the object, e.g., a person, included in the image. Also, a preset number of reference outlines may be displayed. For example, the reference outlines may be uniformly distributed and displayed on the image. Alternatively, the reference outlines may be mainly displayed around regions where many people are detected. In this case, the number of generated reference outlines may be different from the number of displayed reference outlines. This is because reference outlines have to be generated with respect to all locations in the image in order to detect an object that satisfies a certain condition, but only some of the reference outlines may be displayed.

In a related art method, coordinate values corresponding to four corners of a rectangle are regarded as one set, a predetermined number of sets of coordinate value data are received, and a reference outline is generated by using the received data. However, a large number of coordinate value data have to be input to accurately generate the reference outline. If a small number of coordinate value data are input, the size of the reference outline is inaccurate and thus the accuracy of determining an object that satisfies a certain condition is reduced. This is because, when a parameter for determining the width w and the height h of reference outline is inversely calculated by using the input coordinate value data, the coordinate value data for calculating the parameter is not sufficient.

However, according to the above-described signal processing unit, a reference outline may be accurately generated and may be easily adjusted by a user by quantizing a circumstantial parameter. That is, a method for counting moving objects may be easily used by a user.

A method of displaying a size-adjusting UI and a reference outline will now be described in detail.

Figure 5:
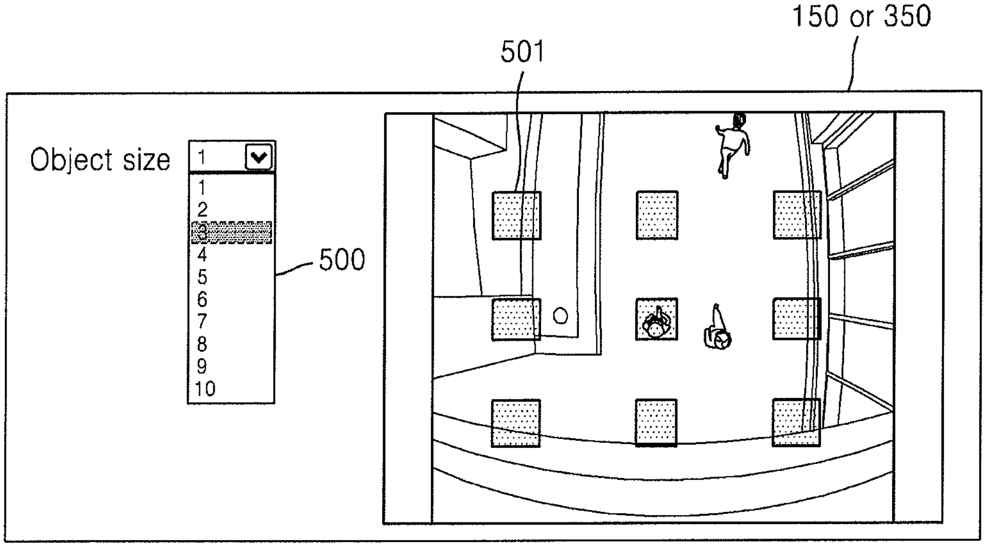
FIG. 5 is an image of a display unit of an image processing apparatus, according to an exemplary embodiment.

FIG. 5 is an image of a display unit of an image processing apparatus, according to an exemplary embodiment.

Referring to FIG. 5, the camera display unit 150 or the server display unit 350 displays a size-adjusting UI 500 and a captured image. Hereinafter, the camera display unit 150 and the server display unit 350 are integrally referred as 'the display unit'.

The size-adjusting UI 500 is formed as a list box for selecting one of quantized values of a circumstantial parameter from a value 1 to a value 10 and, in the current exemplary embodiment, a user selects a value 3 as the circumstantial parameter. Reference outlines 501 corresponding to the selected value of the circumstantial parameter are generated by the outline generation unit 402, and are displayed on the image of the display unit. The reference outlines 501 may be generated at preset locations in the image and the user may compare the reference outlines 501 displayed in real time to a person included in the image. Accordingly, after comparing the currently displayed reference outlines 501 to the person included in the image, the user may generate appropriate-sized reference outlines by appropriately adjusting the selected value of the circumstantial parameter.

Figure 6:
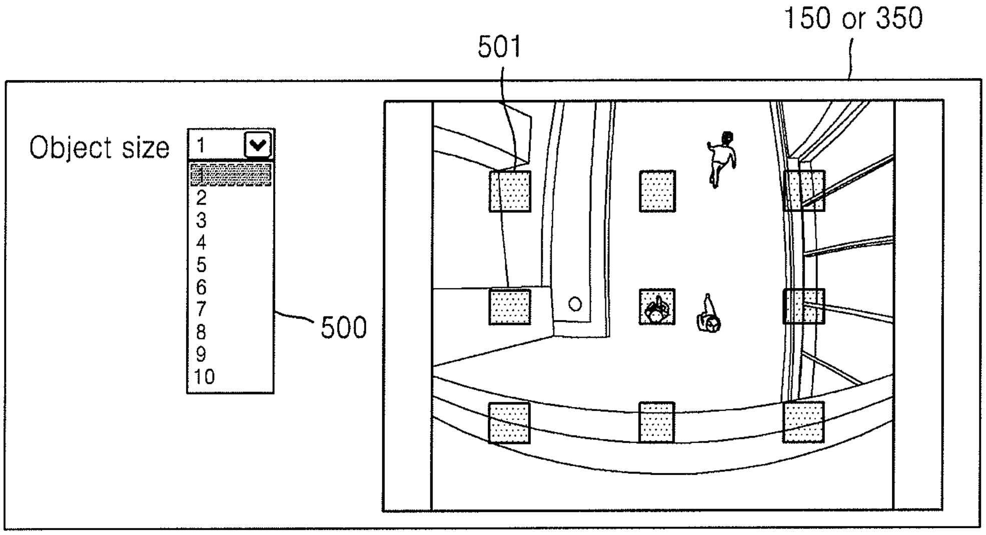
FIG. 6 is an image of a display unit of an image processing apparatus, according to another exemplary embodiment.

FIG. 6 is an image of a display unit of an image processing apparatus, according to another exemplary embodiment.

Referring to FIG. 6, a user adjusts the size-adjusting UI 500 to change the circumstantial parameter from the value 3 to a value 1. In the current exemplary embodiment, the circumstantial parameter is dependent upon a height of the security camera 100. If the security camera 100 is installed at a high location, in comparison to a case when the security camera 100 is installed at a low location, an effect of zooming out a captured image occurs, and thus the size of the person is reduced. Accordingly, the user may adjust the circumstantial parameter to allow the displayed reference outlines 501 to match the person included in the image.

Figure 7:
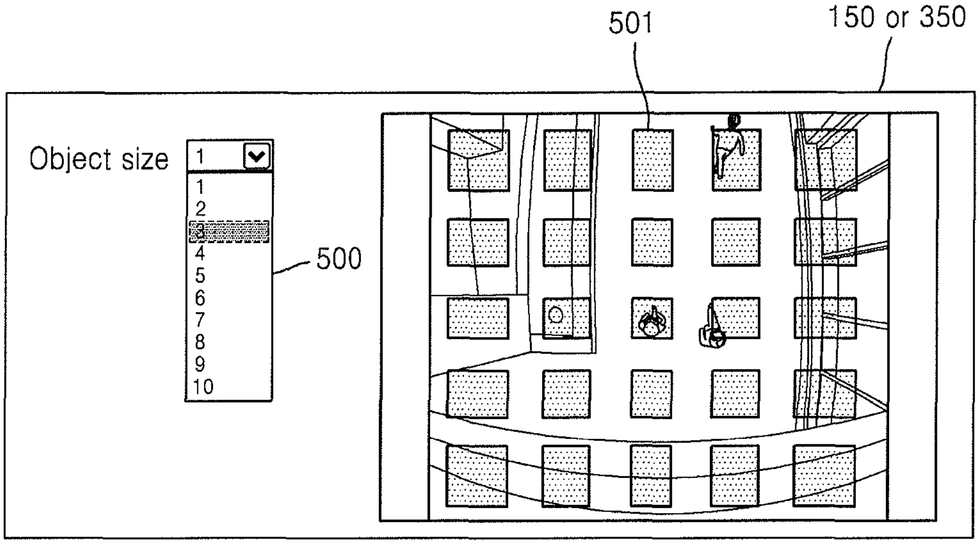
FIG. 7 is an image of a display unit of an image processing apparatus, according to another exemplary embodiment.

FIG. 7 is an image of a display unit of an image processing apparatus, according to another exemplary embodiment.

Referring to FIG. 7, the number of the reference outlines 501 displayed on the image is increased to 25 in comparison to the number of the reference outlines 501 illustrated in FIGS. 5 and 6. As described above, the number of the displayed reference outlines 501 may be adjusted. Although the number of the reference outlines 501 is set as 9 or 25 in FIGS. 5 through 7, the number of the reference outlines 501 is not limited thereto and may be increased or reduced.

Figure 8:
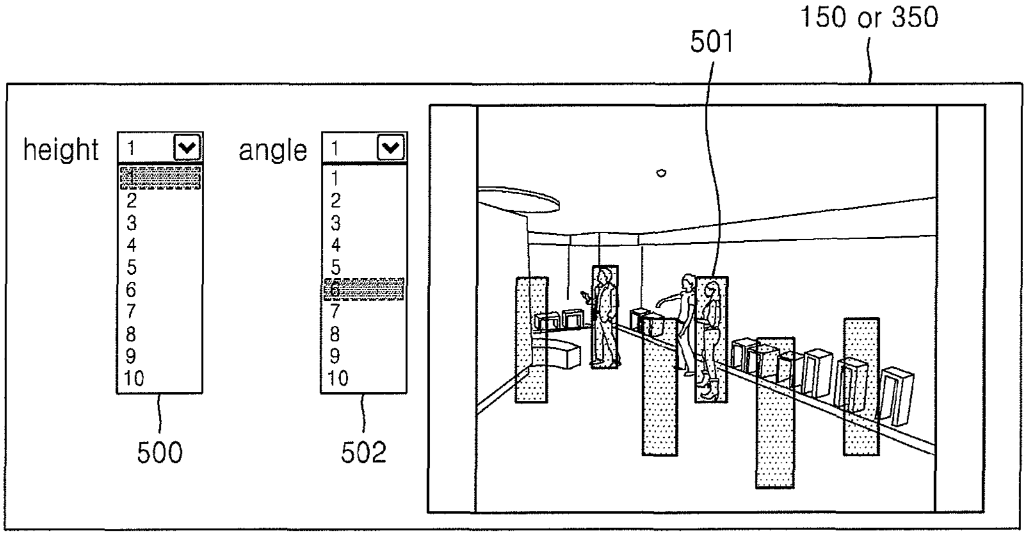
FIG. 8 is an image of a display unit of an image processing apparatus, according to another exemplary embodiment.

FIG. 8 is an image of a display unit of an image processing apparatus, according to another exemplary embodiment.

Referring to FIG. 8, the circumstantial parameter has a 2-dimensional value, and the UI generation unit 404 may generate and display two size-adjusting UIs 500 and 502 such that a user may select two circumstantial parameters. For example, the two circumstantial parameters may represent a height and an image capturing angle of the security camera 100. If the user selects quantized values of the circumstantial parameters with respect to the angle and the height, a preset number of the reference outlines 501 are generated at preset locations by the outline generation unit 402 and are displayed together with a captured image.

As described above, in an image processing apparatus according to an exemplary embodiment, a reference outline for detecting an object that satisfies a certain condition may be generated by using a circumstantial parameter, and may be easily adjusted by using a UI after quantizing the circumstantial parameter. Thus, the user may easily count moving objects in a captured image.

A program, e.g., an algorithm, executed in an image processing apparatus according to the above exemplary embodiments can be stored in a recording medium. Here, the recording medium may be a semiconductor recording medium such as flash memory.

While exemplary embodiments have been particularly shown and described herein, it will be understood by one of ordinary skill in the art that various changes in form and details may be made therein without departing from the spirit and scope of the inventive concept as defined by the following claims.

What is claimed is:

1. An image processing apparatus comprising:

a motion detection unit which detects motion in an image;

an object detection unit which detects objects based on the motion detected by the motion detection unit;

an outline generation unit which generates at least one reference outline having a size which is adjusted according to a preset parameter based on a location in the image; and a calculation unit which calculates a number of objects having a size which is substantially the same as a size of the at least one reference outline from among the objects detected by the object detection unit, a user interface (UI) generation unit which generates a size-adjusting UI for allowing a user to select one of a preset number of quantized parameters; and a display unit which displays the image and the size-adjusting UI, wherein the preset parameter is adjusted according to at least one circumstantial parameter, and wherein the at least one circumstantial parameter is quantized to the preset number of quantized parameters such that an increase rate of the size of the at least one reference outline is linear with respect to a change between sequential quantized parameters.

2. The image processing apparatus of claim 1, wherein the at least one circumstantial parameter is changed according to at least one of a height, an image capturing angle, a zoom ratio, a lens distortion characteristic, and a principal point of a device for capturing the image.

3. The image processing apparatus of claim 1, wherein the UI generation unit changes the size-adjusting UI according to a dimension of the at least one circumstantial parameter.

4. The image processing apparatus of claim 1, wherein a preset number of the at least one reference outline is displayed on the image according to the at least one circumstantial parameter, and wherein the at least one circumstantial parameter is selected by the user.

5. The image processing apparatus of claim 1, wherein the at least one circumstantial parameter is selected by a user from among a plurality of circumstantial parameters.

6. An image processing apparatus comprising:

a user interface (UI) generation unit which generates a size-adjusting UI operable to select at least one circumstantial parameter for determining a size of at least one reference outline used to detect objects in a captured image; and a display unit which displays the captured image and the size-adjusting UI, wherein the at least one circumstantial parameter is quantized to a preset number of quantized parameters such that an increase rate of the size of the at least one reference outline is linear with respect to a change between sequential quantized parameters, and wherein the size-adjusting UI is operable to allow a user to select values corresponding to a dimension of the at least one circumstantial parameter.

7. The image processing apparatus of claim 6, wherein the display unit displays a preset number of the at least one reference outline.

8. The image processing apparatus of claim 6, wherein the size of the at least one reference outline is changeable based on a location in the captured image.

9. A method of counting the number of moving objects in an image captured by a motion-detecting image processing apparatus, the method comprising:

detecting motion in the captured image;

detecting objects in the captured image based on the motion detected in the captured image;

generating at least one reference outline of which a size is adjusted according to a preset parameter based on a location in the captured image; and calculating a number of objects having a size which is substantially the same as the a size of the at least one reference outline from among the objects detected in the captured image, generating a size-adjusting user interface (UI), which is operable to allow a user to select one of a preset number of quantized parameters; and displaying the captured image and the size-adjusting UI, wherein the preset parameter is adjusted according to at least one circumstantial parameter, and wherein the at least one circumstantial parameter is quantized to the preset number of quantized parameters such that an increase rate of the size of the at least one reference outline is linear with respect to a change between sequential quantized parameters.

10. The method of claim 9, wherein the at least one circumstantial parameter is changed according to at least one of a height, an image capturing angle, a zoom ratio, a lens distortion characteristic, and a principal point of a device which captures the image.

11. The method of claim 9, wherein the size-adjusting UI is changeable according to a dimension of the at least one circumstantial parameter.

12. The method of claim 9, wherein a preset number of the at least one reference outline is displayed on the captured image according to the at least one circumstantial parameter, and wherein the at least one circumstantial parameter is selected by the user.

13. The method of claim 9, wherein the at least one circumstantial parameter is selected by a user from among a plurality of circumstantial parameters.

* * * * *